United States Patent [19]

Knief

[11] 4,270,399

[45] Jun. 2, 1981

[54] COUNTER DRIVE MECHANISM

[75] Inventor: Enno A. Knief, Watertown, Wis.

[73] Assignee: Eaton Corporation, Cleveland, Ohio

[21] Appl. No.: 48,900

[22] Filed: Jun. 15, 1979

[51] Int. Cl.[3] .................... F16H 27/02

[52] U.S. Cl. .................... 74/129; 74/161; 74/578

[58] Field of Search .................... 74/84 R, 128, 129, 160, 74/161, 578; 254/109

[56] References Cited

U.S. PATENT DOCUMENTS

| | | | |
|---|---|---|---|
| 2,481,012 | 9/1949 | Haseltine | 74/578 |
| 2,878,961 | 3/1959 | Voorhees et al. | 74/160 |
| 3,136,335 | 6/1964 | Beech et al. | 74/161 |
| 3,184,982 | 5/1965 | Auer | 74/143 |
| 3,219,270 | 11/1965 | Martin et al. | 74/129 |
| 3,470,361 | 9/1969 | Wollar | 235/92 |
| 3,501,968 | 3/1970 | Fredell | 74/128 |
| 3,526,149 | 9/1970 | Wollar | 74/142 |
| 3,802,282 | 4/1974 | Cook | 74/128 |
| 3,967,508 | 7/1976 | Burke | 74/128 |
| 3,969,945 | 7/1976 | Englund | 74/128 |
| 4,120,208 | 10/1978 | Habib | 74/128 |

FOREIGN PATENT DOCUMENTS

| | | | |
|---|---|---|---|
| 2142827 | 3/1973 | Fed. Rep. of Germany | 74/116 |
| 2329447 | 12/1973 | Fed. Rep. of Germany | 74/84 |
| 614899 | 6/1978 | U.S.S.R. | 74/128 |

*Primary Examiner*—Lawrence J. Staab
*Attorney, Agent, or Firm*—H. R. Rather; Wm. A. Autio

[57] ABSTRACT

A drive mechanism for converting reciprocating motion into intermittent rotary motion for use in a decimal counter or the like having an integrally molded drive member having two flexibly mounted pawls which are spring biased to insure engagement with the ratchet teeth and two fixed mounted, escapement type, driving and stopping pawls and an integrally molded, driven ratchet wheel, having two concentric rings of teeth, which in turn is coupled to the number wheels. On the impulse movement, the lower, escapement type pawl disengages a ratchet tooth whereafter, nearly simultaneously, first the rear, flexible pawl drives (pulls) the outer, larger diameter ring of teeth at the rear circumferential side thereof a portion of the first clockwise increment of rotation and then the upper, escapement type pawl smoothly engages and drives the smaller diameter ring of teeth for completion of the first clockwise increment of rotation.

On the return movement, the upper, escapement type pawl disengages the ratchet tooth of the smaller diameter ring of teeth whereafter, nearly simultaneously, the front, flexible pawl drives (pushes) the larger diameter ring of teeth for a portion of the second increment of rotation and then the lower, escapement type pawl smoothly engages and drives the smaller diameter ring of teeth for completion of the second increment of rotation. And holds the ratchet wheel in a stop position until the next step of numerical value rotation during the next cycle of impulse and return movements.

21 Claims, 8 Drawing Figures

COUNTER DRIVE MECHANISM

BACKGROUND OF THE INVENTION

Drive mechanisms for converting reciprocating or oscillating motion to intermittent rotary motion for use in counters, stepping switches or the like have been known heretofore.

One such drive mechanism has used a pawl, pivotally mounted, on a separately pivotally mounted oscillating driving member for stepping a toothed ratchet wheel. Another such drive mechanism has used an escapement type mechanism with two fixed pawls on a pivotally mounted driving member.

Such escapement type mechanism is generally low in cost since it comprises a single piece drive member with the two fixed pawls as an integral part of the drive member. The drive member pivots on a separate shaft or stud and as the fixed pawls, engaging the star wheel ratchet during a counter drive cycle, rotate the star wheel one half of the numerical value rotation during the impulse movement and the other half during the return movement of the reciprocating stroke, for example, in a ten digit per revolution, 36 degree per drive cycle device, the ratchet wheel is rotated 18 degrees for each half of the drive cycle. As the pivotally mounted drive member is driven during the impulse half of the oscillation, the tip of one of the fixed pawls disengages a tooth of the ratchet wheel at one circumferential side thereof and after sufficient movement of the driving member to assure clearance of the first pawl tip and the corresponding tooth, as the ratchet wheel would rotate, has occurred, the second fixed pawl engages a tooth of the star wheel ratchet at the other circumferential side thereof, driving the ratchet a first increment of rotation. At the end of the impulse movement of the oscillation such second, fixed pawl tip, having fully engaged the star wheel ratchet tooth, holds the ratchet in a fixed position. During this impulse movement the first, fixed pawl has moved laterally to the ratchet center-line to assure clearance beyond the outer diameter of the star wheel ratchet. On the return movement of the oscillation, the second increment of the numerical value rotation occurs in the same fashion but with the opposite pawl driving the ratchet. At certain significantly large portions of the driving cycle, the star wheel is unrestrained by the pawls and, if moved by vibration or shock, the drive system can malfunction. The escapement system is an inefficient coupling mechanism due to the large pawl to ratchet wheel clearances required. There is much lost motion in the cooperation between the escapement and the star wheel and, due to the lateral movement of the fixed pawls to provide clearance while the ratchet rotates, a large proportion of the coupling involves sliding motion, friction and wear. To provide sufficient motion of the fixed pawl tips from a typically small available motion of electromechanical prime movers generally in use on counters and the like, a large ratio from prime mover to pawl tips must be provided. The dimensional constraints to achieve this ratio and the geometry requirements between the driving member pivot center-line, the ratchet wheel center-line, and the dimensional criteria for the star wheel teeth tips and the driving member fixed pawl tips and finally the higher wear and erosion of these relative dimensional criteria, due to the high impact caused by the driving member being able to attain a high velocity before engaging the star wheel, is cause for reduction in count life of the mechanism or the addition of manufacturing costs to overcome these effects.

Present pivotally or flexibly mounted pawl drive systems overcome many of these escapement drive difficulties but require more parts and are more costly. Typically the prime mover reciprocating motion is converted to an arcuate motion of a pivoted lever, one end of which contains a pivotally or flexibly, shaft-mounted, spring-loaded pawl. The drive mechanism generally rotates the ratchet wheel a full numerical value step of rotation, for example, 36 degrees for a ten digit counter system during either the impulse or return movement of the driving cycle while the opposite movement is used in cocking the pawl-lever member, that is, storing energy in a spring for driving the ratchet or returning the pawl-lever member to the original position for the next cycle. This mechanism must provide a means for stopping the rotation of the ratchet wheel at the end of the desired angular rotation, since the pivotally or flexibly mounted pawl would permit the ratchet wheel to continue to rotate, inhibited only by the spring force of the pawl spring holding the pawl against the ratchet tooth. With the high rotational velocity developed during the driving half of the cycle, used to rotate a complete step, the impact and frictional wear generated in stopping the ratchet wheel at the desired position can be considerable. Further, an anti-backup means must be provided to prevent reverse rotational movement of the ratchet wheel during the cocking movement of the pawl. This reverse rotation is caused by the sliding friction and pawl spring bias force of the pawl against the ratchet tooth as the pawl slides over and hooks the next ratchet tooth for the next cycle. These driving mechanisms must generally provide a greater stroke at the pawl than is provided by commonly used electromechanical prime movers and therefore require a ratio in the pivoted lever assembly which, combined with the carefully located geometry required between the driving member pivot center-line, the pawl pivot center-line or location of the pawl tip when flexibly mounted, and the ratchet wheel center-line, the stopping means dimensional requirements as related to the ratchet wheel teeth and the anti-backup means dimensional requirements as related to the ratchet wheel teeth, escalates manufacturing and assembly costs.

While these prior drive mechanisms have been useful for their intended purposes, they nevertheless have had certain disadvantages such as low efficiency, high cost, lack of design flexibility, noisy operation, short life, limited speed capability and poor reliability. Therefore, it has become desirable to provide an improved drive mechanism that overcomes such disadvantages, which drive mechanism may be used to convert rectilinear motion to intermittent rotary motion in a large variety of applications such as counters, timers, metering devices, positioning sensors, indicators and the like.

SUMMARY OF THE INVENTION

An object of the invention is to provide an improved drive mechanism whereby reciprocating motion is converted to intermittent rotary motion.

A more specific object of the invention is to provide an improved counter drive mechanism.

Another specific object of the invention is to provide an improved reciprocating to intermittent rotary motion drive mechanism having high coupling efficiency in that over ninety percent of the reciprocating motion produces corresponding rotary motion resulting in lower angular velocities and the corresponding lower starting and stopping impact requirements.

Another specific object of the invention is to provide an improved reciprocating to intermittent rotary motion drive mechanism wherein sliding contact, friction and wear are reduced.

Another specific object of the invention is to provide an improved reciprocating to intermittent rotary motion drive mechanism wherein substantially greater coupling efficiency is implemented by smooth, uninterrupted transfer of the reciprocating drive from a larger diameter ratchet to a smaller diameter ratchet thereby to obtain a larger angle of rotary motion for a unit length of driving stroke with less lost motion.

Another specific object of the invention is to provide an improved reciprocating to intermittent rotary motion drive mechanism having means affording control of velocity and acceleration of the drive parts and thereby reducing the related impact, wear and friction associated with such velocity and acceleration.

Another specific object of the invention is to provide an improved reciprocating to intermittent rotary motion drive mechanism that provides long life, quiet operation and high speed capability.

Another specific object of the invention is to provide an improved reciprocating to intermittent rotary motion drive mechanism having a driving member directly coupled to the prime mover thereby eliminating critical dimensionally and geometrically interrelated requirements of separate parts of the total mechanism.

Another specific object of the invention is to provide an improved reciprocating to intermittent rotary motion drive mechanism having manufacturing costs comparable to or lower than an escapement drive mechanism.

Another specific object of the invention is to provide an improved reciprocating to intermittent rotary motion drive mechanism that economizes the space required to accommodate the same.

Another specific object of the invention is to provide an improved reciprocating to intermittent rotary motion drive mechanism that affords a wide range of flexibility in accommodating a variety of input drive arrangements, mechanical and electromechanical, to produce the reciprocating motion.

Another specific object of the invention is to provide an improved reciprocating to intermittent rotary motion drive mechanism that affords a wide range of flexibility in accommodating a variety of angular output motions, for the impulse and/or return stroke of the reciprocating motion, as might be adapted to various transitional conditions of the rotary motion drive.

Other objects and advantages of the invention will hereinafter appear.

DESCRIPTION OF THE PREFERRED EMBODIMENT

Figure 1:
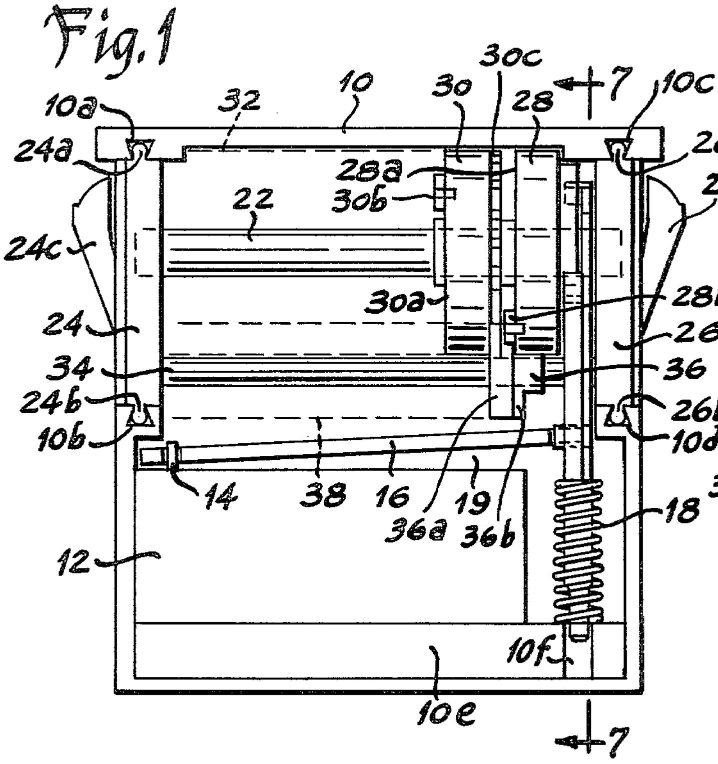
FIG. 1 is an enlarged front elevational, partly schematic view of a counter showing its reciprocating to intermittent rotary motion drive mechanism including an electromagnet, armature, drive pawl and ratchet wheel, and additional decimal digit number wheels coupled through pinions to the units digit, driven ratchet wheel.
Figure 2:
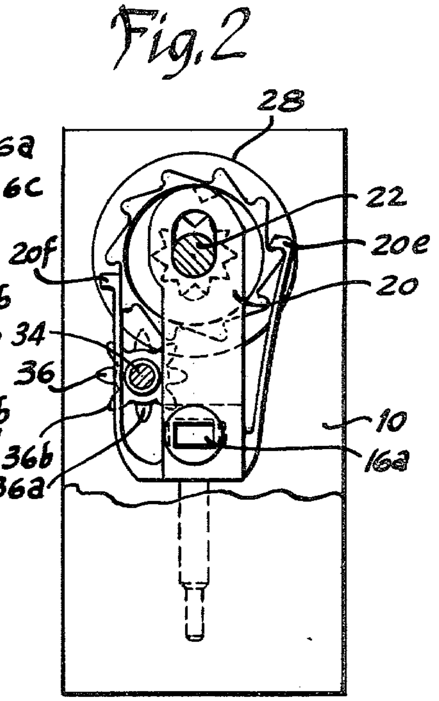
FIG. 2 is a right side elevational view of the counter of FIG. 1 with a portion of the frame broken away to show the plural-pawl driving member and generally the location of the parts.

Referring to FIGS. 1 and 2, there is shown a counter such as a decimal counter or the like incorporating the invention. This counter comprises a generally rectangular frame 10 having two pairs of mounting grooves **10*a–b* and 10*c–d* extending rearwardly at its upper and central portions for mounting the counter subassembly or the like. The lower half of this frame including bottom portion 10*e* thereof is arranged to mount and support an electromagnet 12 which conventionally includes a magnetic circuit in the form of an air-gapped frame of magnetic material such as iron and an energizing coil shown schematically in FIG. 1. A pivot 14 supports an armature 16 on the electromagnet at a point near the rear end (left end in FIG. 1) of the armature from its longitudinal center. The right end of the armature is biased upwardly by an armature return spring 18 so that the working end (right end in FIG. 1) is open with respect to the air gap 19 of the electromagnet frame. This return spring 18 may be a helical spring or the like around the lower stem 20*a* of the drive member 20 and having its lower end abutting bottom portion 10*e* of the frame and having its upper end abutting enlarged portion 20*b* of the drive member. This spring 18 is in compression so that whenever the electromagnet is not energized, it will raise the drive member and the working, right end of the armature to the position shown in FIG. 7. Whenever the electromagnet is energized, it will attract the armature and pivot its working, right end down to close the magnet air gap and pull the drive member down to the position shown in FIG. 8** with a one-to-one ratio from prime mover to drive member which reduces the requirements of interrelated parts geometry and tolerances.

Figure 6:
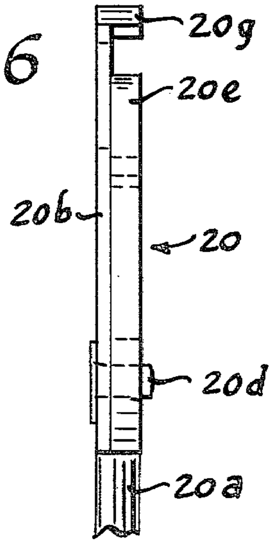
FIG. 6 is a rear view of the plural-pawl driving member to show the co-planar location of the flexibly mounted and escapement type pawls.
Figure 5:
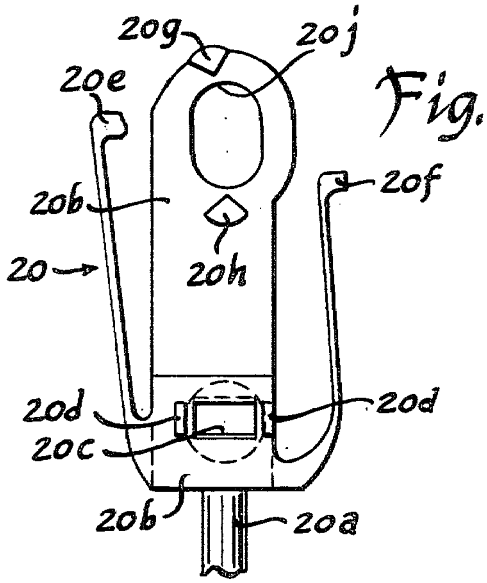
FIG. 5 is an enlarged view of the left (inner) side of the four-pawl driving member of FIG. 1 showing details thereof.

Intercoupling means are provided between the working end of the armature and ratchet driving member 20. For this purpose, the working end of the armature is provided centrally thereof with a narrow tang or tongue **16*a* that extends into a generally rectangular opening 20*c* at the mid-portion of driving member 20 so that the armature moves the driving member downwardly compressing spring 18 further when the electromagnet is energized and the driving member moves the armature back upwardly under the force of the return spring when the electromagnet is deenergized. This opening 20*c* has curved upper right and lower left corners as shown in FIGS. 5–6 to allow pivoting or rocking of the armature tongue freely therein but without slack when the electromagnet is operated. A pair of curved-ended bumps 20***d*, one on each side of opening 20*c*, bear against the armature on opposite sides of tongue 16*a* to facilitate relative rocking therebetween as shown in FIG. 1.

The counter shown in FIGS. 1 and 2 is provided with a series of decimal number wheels mounted on a shaft 22 that extends between a pair of shaft carriers 24 and 26 having pairs of mounting tongues 24*a–b* and 26*a–b* fitting into grooves 10*a–b* and 10*c–d* in frame 10. The shaft carriers 24 and 26 are preferably identical, each having three blind holes therein, one for number wheel shaft 22 and the other two for pinion shaft 34. By providing two such blind holes symmetrically arranged for the pinion shaft, identical carriers can be used with one of them turned around with respect to the other one. Thus, the pinion shaft will line up with one hole in one carrier and the other hole in the other carrier turned 180 degrees. Pairs of snap-in tabs 24*c* and 26*c* may be formed integrally with carriers 24 and 26 for snap-in mounting of the counter in a suitable panel or housing. These number wheels include from the right toward the left in sequence in FIG. 1 a units digit number wheel 28 that is integral with the ratchet hereinafter described, a tens digit number wheel, 30, and additional like number wheels 32 for the hundreds, thousands, etc. digits, as desired, shown schematically by broken lines in FIG. 1. A spacer retains the number wheels snug against one another and the drive member.

Figure 3:
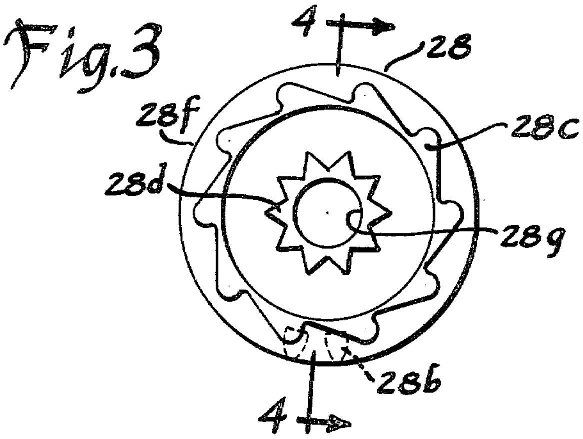
FIG. 3 is an enlarged view of the toothed side of the ratchet wheel shown schematically in FIG. 2.
Figure 4:
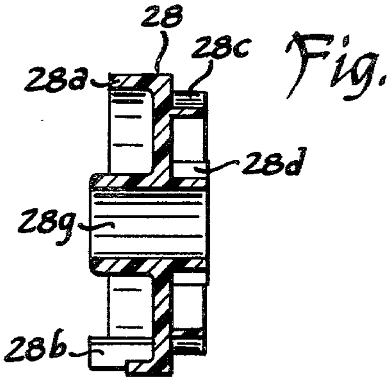
FIG. 4 is a cross-sectional view taken along line 4—4 of FIG. 3 to show details of the ratchet wheel.

These number wheels with the exception of the units digit number wheel are driven in decimal sequence by a series of pinion gears mounted on a shaft 34 that extends between carrier members 24 and 26, these pinions being suitably spaced below the number wheels, one pinion 36 thereof being shown in FIGS. 1 and 2 and the remainder 38 thereof being indicated by broken lines. As shown in FIG. 1, pinion 36 is between units digit number wheel 28 and tens digit number wheel 30. The next pinion is between tens digit number wheel 30 and the adjacent hundreds digit number wheel, etc. With this arrangement, for each revolution of any number wheel, the associated pinion will be controlled to advance the next higher digit number wheel one step. For this purpose, each number wheel is provided with a narrow flange and a pair of wider teeth on its left side as seen in FIG. 1 and each number wheel except the pawl-driven ratchet wheel is provided with a ring of teeth on its right side. Thus, units digit or ratchet wheel 28 has a narrow flange 28*a* interrupted by a pair of wider teeth 28*b* on its left side as shown in FIGS. 1, 3 and 4. And tens digit wheel 30 has similar elements 30*a* and 30*b*. Also, tens digit wheel 30 has a ring of teeth 30*c* on its right side. To cooperate therewith, pinion 36 has alternately arranged narrow 36*a* and wide 36*b* teeth as shown in FIG. 1 so that there will be wide teeth on opposite sides of each narrow tooth. All of the pinion teeth will mesh with the ring of teeth 30*c* on the right side of wheel 30. The wide pinion teeth will mesh with the pair of teeth 28*b* on the left side of number wheel 28 whereas the pair of wide teeth on opposite sides of a narrow tooth will abut flange 28*a* to keep the pinion from turning except when it is stepped by the pair of teeth 28*b*.

With this decimal wheel arrangement, when the units digit wheel is stepped by the pawl and ratchet drive mechanism, smooth flange 28*a* will rotate in close proximity to the pair of wide teeth of pinion 36 to keep the pinion from turning. When the pair of teeth 28*b* reach the pinion and pass thereover, they will engage a wide tooth and rotate the pinion from a position where one narrow tooth thereof is in mesh with ring gear 30*c* of the next number wheel 30 to a position where the succeeding narrow tooth is in mesh therewith. This rotation of the pinion will drive number wheel 30 one step forward so that the next tens digit is displayed.

As hereinbefore mentioned, the units digit number wheel has a ratchet means integrally molded therewith and is driven by the plural-pawl drive member now to be described in detail.

As shown in FIG. 3, driven member 28 is provided with a pair of ratchets or rings of teeth including an outer or larger diameter ring 28*c* of external teeth and an inner or smaller diameter ring 28*d* of external teeth with the units digits 0–9 being formed and painted on the peripheral surface 28*f*. This driven member or units digit wheel is provided with a center hole 28*g* through which its supporting shaft 22 passes and on which it turns when driven as hereinafter described. As shown in FIG. 3, each ratchet 28*c* and 28*d* is provided with ten teeth corresponding to the decimal digits 0–9 that it will display as it is advanced in ten steps through each revolution. As shown in FIG. 3, the teeth of outer ring or track 28*c* are rounded to control the velocity and acceleration of the front and rear flexibly-mounted pawls as they slide over these teeth to hook them. As shown in FIG. 4, these outer and inner rings of teeth or tracks 28*c* and 28*d* are formed on a pair of concentric flanges with the inner flange being immediately around center hole 28*g* and the outer flange being spaced outside the inner flange but having a smaller diameter than the numbered periphery of this driven member. The inner flange and teeth 28*d* thereon are slightly wider than the outer flange as shown in FIG. 4 to limit friction between the inner face of driving member 20 and the ratchet wheel as the driving member is reciprocated. Outer teeth 28*c* are on the periphery of the outer flange and inner teeth 28*d* are on the periphery of the inner flange.

Driving member 20 is provided with means for driving the ratchet throughout almost its entire reciprocating motion, that is, over ninety percent of the motion of the driving member is used to rotate the ratchet so that there is less than ten percent lost motion. This means comprises two flexibly-mounted pawls 20*e* and 20*f* and two escapement type pawls 20*g* and 20*h* on the driving member. As shown in FIGS. 5–8, driving member 20 has a generally flat vertical body portion 20*b* with a vertically-arranged oblong hole 20*j* therein through which number wheel shaft 22 extends and the lower reduced end 20*k* of stem 20*a* extends into a small vertical hole 10*f* in the frame to mount the driving member on the counter. Oblong hole 20*j* serves to mount and guide the driving member with respect to the ratchet while permitting vertical reciprocating motion thereof as hereinafter described.

Figure 7:
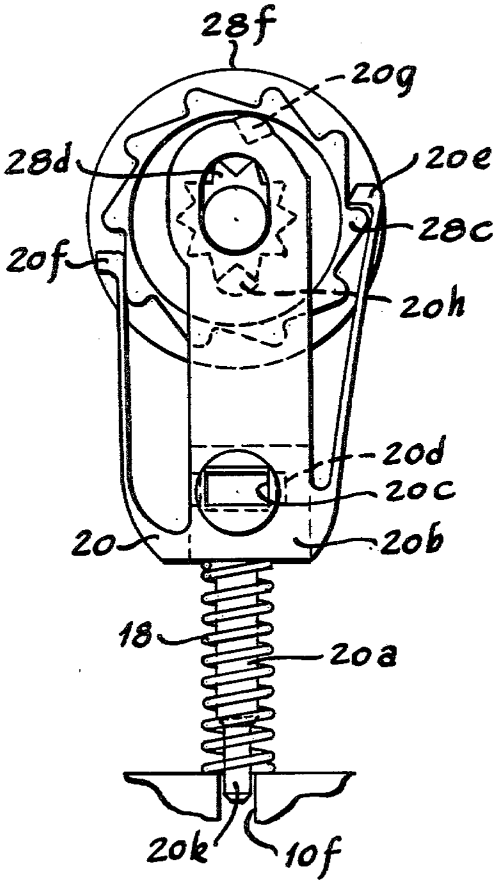
FIG. 7 is an enlarged view taken substantially along line 7—7 of FIG. 1 and showing the pawl and ratchet in stopped position before the start of the down stroke of the plural-pawl driving member.
Figure 8:
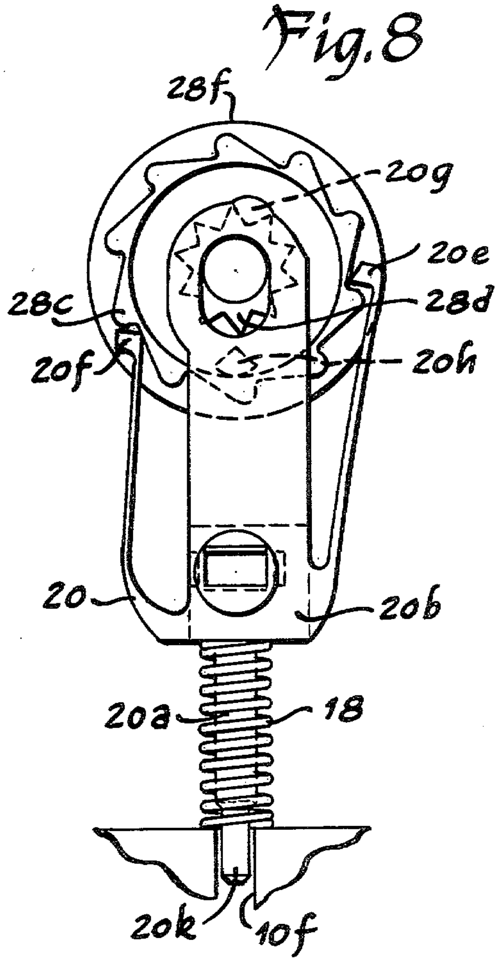
FIG. 8 is a view like FIG. 7 but showing the pawl and ratchet in the transitory position at the end of the down stroke but before the start of the up stroke of the plural-pawl driving member.

The rear and front pawls 20*e* and 20*f* are resilient whereas the center pawls 20*g* and 20*h* are stiff so as to afford the required engagement of the ratchet. For this purpose, rear pawl 20*e* is provided with a straight resilient stem integrally molded with the remainder of the driving member so that it is stressed outwardly when it is assembled on the ratchet as shown in FIGS. 7 and 8 and consequently will have an inherent inward, resilient bias for effective sliding up over and snap-in engagement of the ratchet teeth. This stem of pawl 20*e* extends up from the thicker lower end portion of main body portion 20*b* of the drive member in order to give sufficient resilient length and is normally oriented at a small outward angle as shown in FIGS. 5 and 6. As shown in FIG. 5, pawl *20e* is offset to one side of the main body portion *20b* of the driving member 20 so that whereas such body portion slides up and down on the end of the flange having inner teeth *28d*, pawl *20e* will engage teeth *28c* on the outer ring thereof.

Front resilient pawl *20f* is provided with a resilient outwardly and upwardly extending arm so that it will rotate (push) the ratchet wheel clockwise when the driving member moves up in the return stroke. For this purpose, the front arm curves outwardly and then upwardly to provide space between it an main body portion *20b* of the driving member for pinion shaft 34 as shown in FIG. 2. This curvature is such that this pawl must be slightly stressed outwardly when it is assembled on the ratchet wheel as shown in FIGS. 7 and 8 so that it will have an inherent inward, resilient bias for effective sliding down over and snap-in engagement of the rachet teeth *28c*. This front pawl is also offset to one side of the main body portion of the driving member into the plane of pawl *20e* as shown in FIG. 1, so that its resilient portion is in the plane of the ratchet teeth *28c* to engage the same while the main body portion of the drive member slides on the side of ratchet ring *28d* as shown in FIG. 1.

It will be apparent from the foregoing that the resilient stresses in the arms of pawls *20e* and *20f* cause the two teeth at the respective tips thereof to engage the larger diameter ring of ratchet teeth at substantially the center of the rear periphery thereof and below the center of the front periphery thereof in the normal rest positions as shown in FIG. 7. This difference in initial angle of engagement is necessary because pawl *20e* pulls the ratchet wheel for only a portion of the down stroke before pawl *20g* takes over whereas pawl *20f* pushes the ratchet wheel for a portion of the up-stroke of the driving member before pawl *20h* takes over the driving as hereinafter described.

The two escapement type pawls herein before mentioned will now be described. As shown in FIG. 5, these escapement type pawls *20g* and *20h* are rigidly formed on main body portion *20b* of the drive member, pawl *20g* being above hole *20j* and pawl *20h* being below hole *20h*. These escapement type pawls are located with respect to the vertical axis of the drive member and are shaped and dimensioned relative to smaller ratchet wheel teeth *28d* in such a manner as to afford smooth transfer of driving action thereto from the flexibly-mounted pawls and holding at the end of each stroke as hereinafter described. As shown in FIG. 7, pawl *20g* is separated from but directed toward the upper part of smaller ratchet *28d* in its normal up-stroke position. And as shown in FIG. 8, pawl *20h* is separated from but directed toward the lower part of smaller ratchet *28d* in its down-stroke position.

The operation of the drive mechanism will now be described starting with its normal stopping position shown in FIG. 7. It will be seen that in this position, escapement type stop pawl *20h* is in one of the stop notches between teeth *28d* so that the ratchet wheel is held in fixed position wherein one of the units digits is centered at the top of periphery *28f* of the units digit number wheel.

The electromagnet is now pulsed to step the units digit wheel one step to position the succeeding units digit at the top display position. As a result, the electromagnet attracts the armature to pivot it so that its tang end pulls drive member 20 down and compresses spring 18 as shown in FIG. 8. When the electrical pulse terminates, spring 18 returns the armature and actuates drive member 20 back up to the normal position shown in FIG. 7. During this stepping action, as the armature starts to move down, it pulls drive member 20 with it. Initially, escapement type pawl *20h* moves out of the stop notch between teeth *28d* enough to release the ratchet and immediately thereafter pawl *20e* engages a tooth *28c* of the outer ratchet and starts to rotate the units digit wheel clockwise. For reference, the tooth now engaged by rear pawl *20e* will be called the first tooth of the outer ratchet whereas the tooth to be next engaged by escapement type pawl *20g* will be called the first tooth of the inner ratchet. As this number wheel rotates clockwise a first increment, the first tooth inner ratchet moves to the relative to pawl *20g*. Therefore, while pawl *20e* is still driving the outer ratchet, pawl *20g* engages the first tooth of the inner ratchet to take over the drive action and to speed up the clockwise rotation of the number wheel. This transfer of the drive from pawl *20e* to *20g* occurs while the number wheel is turning so as to minimize rotary speed change. This speed up comes about due to the radius of the inner ratchet being shorter than the radius of the outer ratchet and the shape of pawl *20g* and teeth *28d*. Therefore, for the same downward movement of drive member 20, pawl *20g* will rotate the number wheel through a slightly larger angle than pawl *20e*. Consequently, during this second increment of clockwise rotation, the first tooth of the outer ratchet will separate slightly from and move ahead of the hook of pawl *20e*, and the long face of the second tooth (counting counter-clockwise) of the outer ratchet will slide on this hook slightly as pawl *20g* drives the number wheel the second increment clockwise to the end of the down stroke.

During this down stroke, the lower end of drive member 20 compresses spring 18 to damp the motion of the drive member and the armature coupled thereto.

Going back to the start of the down stroke, it will be apparent that as the number wheel was rotated the first increment clockwise, the long face of the seventh tooth (counting counterclockwise) of the outer ratchet slid on the hook of front pawl *20f*. Then near the end of this impulse increment of clockwise rotation of the number wheel, the rounded short face of the seventh tooth of the outer ratchet passed above the heel of front pawl *20f* as shown in FIG. 8 and this heel snapped below it preparatory to pushing this seventh tooth for the final increments of clockwise rotation now to be described. At the same time, escapement pawl *20g* engaged firmly between the teeth of ratchet *28d* to hold the ratchet immobile as shown in FIG. 8.

The drive member is now at bottom of its down stroke as shown in FIG. 8 and its acceleration has been limited by spring 18 to reduce noise and wear. This position of the drive member is a transitory condition since upon termination of the electromagnet energizing pulse, return spring 18 immediately pivots the armature back up to its normal position shown in FIG. 7. In this transitory condition at the end of the down stroke, the ratchet wheel is held by pawl *20g* engaging ratchet *28d*. On the subsequent up stroke under the force of the return spring pawl *20g* first separates from teeth *28d* and then the heel of pawl *20f* engages the aforementioned seventh tooth of outer ratchet *28c* and rotates the units digit number wheel a third increment clockwise until escapement pawl *20h* actuates ratchet *28d* the fourth increment clockwise or the final amount to a position similar to that shown in FIG. 7. At the end of this upstroke, pawl 20h enters the next stop notch between the teeth of ratchet 28d to hold the number wheel from creeping in the event of vibration or the like. In this stopping position, the next units digit is displayed at the top center of the number wheel.

While the apparatus hereinbefore described is effectively adapted to fulfill the objects stated, it is to be understood that the invention is not intended to be confined to the particular preferred embodiment of counter drive mechanism disclosed, inasmuch as it is susceptible of various modifications without departing from the scope of the appended claims.

I claim:

1. A drive mechanism for converting reciprocating motion of a drive member to intermittent progressive motion of a driven member comprising:
a driven member comprising first and second ratchets, each including a series of ratchet teeth;
a reciprocating drive member operable to execute an impulse stroke followed by a return stroke in response to actuation thereof;
means for actuating said drive member;
and said drive member comprising a first driving pawl engaging said first ratchet for driving said driven member a first increment during the first part of said impulse stroke and a second driving and stopping pawl that engages said second ratchet to drive said driven member a second increment during the second part of said impulse sroke terminating at the end of said impulse stroke in firm engagement of said second ratchet by said driving and stopping pawl to hold said driven member in a stop position whereby to increase the coupling efficiency between said drive member and said driven member.

2. A drive mechanism for converting reciprocating motion of a drive member into intermittent rotary motion of a driven member comprising:
a rotary driven member comprising first and second ratchets of different sizes, each including a ring of ratchet teeth;
a reciprocating drive member operable to execute an impulse stroke followed by a return stroke in response to actuation thereof;
means for actuating said drive member;
and said drive member comprising a first pawl engaging said first ratchet for driving said rotary member a first increment at a first radius during the first part of said impulse stroke and a second pawl that engages said second ratchet to drive said rotary member a second increment at a second radius during the second part of said impulse stroke followed by deceleration and stopping whereby said driven member is driven at a smooth transition from said first pawl to said second pawl for a substantially constant speed ending in deceleration and stopping of said driven member.

3. The drive mechanism claimed in claim 2, wherein:
said different sizes of said first and second ratchets consist of different diameters wherein said first ratchet has a larger diameter ring of teeth than said second ratchet.

4. The drive mechanism claimed in claim 3, wherein:
said first and second parts of said impulse stroke are at substantially continuous speed but said second pawl drives said driven rotary member with a camming action due to the relative shape of said second pawl and the teeth on said second ratchet and then enters a notch between two teeth to stop said driven member.

5. The drive mechanism claimed in claim 4, wherein:
both said first and second ratchets have the same number of teeth.

6. The drive mechanism claimed in claim 2, wherein:
said drive member including said first and second pawls thereof is a one-piece integrally-molded plastic member.

7. A drive mechanism for providing intermittent rotary motion in response to reciprocating motion comprising:
driven means comprising a rotary driven member comprising first and second ratchets of different diameters and each including a ring of ratchet teeth;
driving means comprising a reciprocating drive member operable to execute an impulse stroke followed by a return stroke in response to each successive cycle of actuation thereof;
and means for actuating said drive member in successive cycles;
and said drive member comprising a first pawl for engaging said first ratchet on one side thereof to drive said rotary member a first angular increment during the first part of said impulse stroke and a second pawl for engaging said second ratchet to drive said rotary member a second angular increment during the second part of said impulse stroke without interruption following said first angular increment thereby to increase the percentage of coupling between said members while reducing lost motion therebetween and also increasing the angle of rotation of said driven member for a given length of drive member stroke.

8. The drive mechanism claimed in claim 7, wherein:
said first and second ratchets have an equal number of teeth.

9. The drive mechanism claimed in claim 7, wherein:
said means for actuating said drive member comprises means for actuating said drive member linearly in each of said impulse and return strokes.

10. The drive mechanism claimed in claim 7, wherein:
said drive member also comprises a third pawl for engaging said first ratchet on the opposite side thereof with respect to said first pawl to drive said rotary member a third angular increment during said return stroke.

11. The drive mechanism claimed in claim 10, wherein:
said rotary driven member comprises a ring of spaced stop notches between the teeth of said second ratchet;
and said drive member comprises a fourth pawl for engaging one of said stop notches at the end of said return stroke to retain said rotary member immobile until said drive member is again actuated.

12. The drive mechanism claimed in claim 11, wherein:
said fourth pawl is integral with and a rigid projection on said drive member.

13. The drive mechanism claimed in claim 10, wherein:
said first and second ratchets of different diameters are concentrically disposed on substantially the same plane on said rotary driven member and said first ratchet is larger in diameter than said second ratchet.

14. The drive mechanism claimed in claim 13, wherein:

said first and third pawls comprise means resiliently biasing the same against said first ratchet.

15. The drive mechanism claimed in claim 11, wherein:

said first and second ratchets and said spaced stop notches are concentrically disposed on substantially the same plane on said rotary driven member.

16. The drive mechanism claimed in claim 15, wherein:

said rotary driven member including said first and second ratchets and said spaced stop notches is a single-piece molding of plastic material.

17. The drive mechanism claimed in claim 11, wherein:

said drive member including said four pawls thereof is a single-piece molding of plastic material.

18. The drive mechanism claimed in claim 7, wherein:

said driving means also comprises resilient means for decelerating and stopping said drive member at the end of said second part of said impulse stroke thereof to reduce noise.

19. The drive mechanism claimed in claim 18, wherein:

said resilient means is a spring biasing said drive member in the direction of said return stroke.

20. The drive mechanism claimed in claim 19, also including:

a supporting frame for said drive mechanism having a guiding hole therein;

and a reduced portion on said drive member extending into said hole to be guided thereby in its reciprocating motion.

21. The drive mechanism claimed in claim 7, wherein:

said driven means also comprises:

a first number wheel integral with said rotary driven member;

at least one additional number wheel;

means comprising a common shaft supporting said number wheels for rotation;

a pinion gear;

means comprising a pinion shaft supporting said pinion gear for rotation with respect to said number wheels;

intercoupling means between said number wheels and said pinion gear for causing one step of rotation of said additional number wheel for each predetermined amount of rotation of said first number wheel;

and an elongated opening in said drive member through which said common shaft freely extends to support said drive member while allowing said reciprocating motion.

* * * * *

UNITED STATES PATENT AND TRADEMARK OFFICE

CERTIFICATE OF CORRECTION

PATENT NO. : 4,270,399

DATED : June 2, 1981

INVENTOR(S) : Enno A. Knief

It is certified that error appears in the above—identified patent and that said Letters Patent is hereby corrected as shown below:

On Title page, "Knief" should read -- Knief et al --.

On Title page, column 1, line 2, reads "Inventor: Enno A. Knief, Watertown, Wis." should read -- Inventors: Enno A. Knief; Thomas E. Woolley, both of Watertown, Wis. --.

Column 9, line 15, reads "I" should read -- We --.

Signed and Sealed this

*Third* Day of *August 1982*

[SEAL]

*Attest:*

GERALD J. MOSSINGHOFF

*Attesting Officer* *Commissioner of Patents and Trademarks*